(12) United States Patent
Giuseppin et al.

(10) Patent No.: US 8,821,956 B2
(45) Date of Patent: Sep. 2, 2014

(54) NON-ASTRINGENT PROTEIN PRODUCTS

(75) Inventors: Marco Luigi Federico Giuseppin, Gieten (NL); Nelly Hermina van Nieuwenhuijzen, Bemmel (NL); Teartse Tim Lambers, Nijmegen (NL); Robin Eric Jacobus Spelbrink, Groningen (NL)

(73) Assignee: Cooperatie Avebe U.A., Veendam (NL)

( * ) Notice: Subject to any disclaimer, the term of this patent is extended or adjusted under 35 U.S.C. 154(b) by 123 days.

(21) Appl. No.: 13/502,818

(22) PCT Filed: Nov. 12, 2010

(86) PCT No.: PCT/NL2010/050756
§ 371 (c)(1),
(2), (4) Date: Jun. 1, 2012

(87) PCT Pub. No.: WO2011/059330
PCT Pub. Date: May 19, 2011

(65) Prior Publication Data
US 2012/0244272 A1    Sep. 27, 2012

(30) Foreign Application Priority Data
Nov. 13, 2009   (EP) ..................... 09175963

(51) Int. Cl.
*A23L 2/66*       (2006.01)
(52) U.S. Cl.
USPC ........... 426/656; 426/481; 426/637; 426/640; 426/658
(58) Field of Classification Search
USPC ........................ 425/637, 640, 656, 658, 481
See application file for complete search history.

(56) References Cited

U.S. PATENT DOCUMENTS 8,465,911 B2 *   6/2013  Giuseppin et al. ................. 435/4
2006/0159805 A1 *  7/2006  Funda et al. ..................... 426/72

FOREIGN PATENT DOCUMENTS

| EP | 1698239 A1 | 9/2006 |
| EP | WO 2007/054587 A1 | 5/2007 |
| EP | 1974615 B1 | 12/2009 |
| NL | WO 2008/069650 A1 | 6/2008 |
| WO | WO 2009/117572 A1 | 9/2009 |

OTHER PUBLICATIONS

"Advanced Organic Chemistry reactions, mechanisms and structure" (3rd ed.). New York: John Wiley & Sons, Inc. ISBN 0-471-85472-7, pp. 796-799; Mar. 1985.
McMurry (McMurry, Organic Chemistry (1996), 4th edition, Pacific Grove (USA): Brooks/Cole Publishing Company, ISBN 0-534-23823-7, pp. 733-734 and 1138.
OPA, phtaldialdehyde, CAS 643-79-8, 1996.
Bertrand-Harb C., et al. "Determination of Alkylation Degree by Three Colorimetric Methods and Amino Acid Analysis", Science Des Aliments; pp. 577-584, vol. 13; 1993.

(Continued)

*Primary Examiner* — Helen F Heggestad
(74) *Attorney, Agent, or Firm* — Hoffmann & Baron, LLP

(57) ABSTRACT

The invention relates to a protein that can be added to a food product or beverage without thereby providing the food product or beverage with a strong astringent taste, an undesirable colouring and/or an off-taste. More in particular, the invention relates to a potato protein glycated with a reducing sugar, wherein the reducing sugar is preferably chosen from the group consisting of reducing monosaccharides, reducing disaccharides, dextran and combinations thereof.

27 Claims, 7 Drawing Sheets

(56) References Cited

OTHER PUBLICATIONS

Grandhee, et al.—Mechanism of Formation of the Maillard Protein Cross-link Pentosidine—Jun. 25, 1991—The Journal of Biological Chemistry—vol. 266, 11649-11653.

Hirschberg et al., "Cloning, Expression, Purification and Characterization of Patatin, A Novel Phospholipase A", Eur. J. Biochem, vol. 268, pp. 5037-5044; 2001.

Vlassara et al., "Pathogenic Effects of Advanced Glycosylation: Biochemical, Biologic, and Clinical Implications for Diabetes and Aging", Laboratory Investigation, vol. 70, No. 2, pp. 138-151; 1994.

Pots et al., "The Effect of Storage of Whole Potatoes of Three Cultivars on the Patatin and Protease Inhibitor Content; A Study Using Capillary Electrophoresis and MALDI-TOF Mass Spectrometry", Journal of the Science of Food and Agriculture, vol. 79, pp. 1557-1564; 1999.

McMurry (McMurry, Organic Chemistry (1996), 4th edition, Pacific Grove (USA): Brooks/Cole Publishing Company, ISBN-534-23823-7, p. 733-734.

* cited by examiner

Figure 7: QDA attribute scores of glycated LMW isolate vs. control and reference proteins
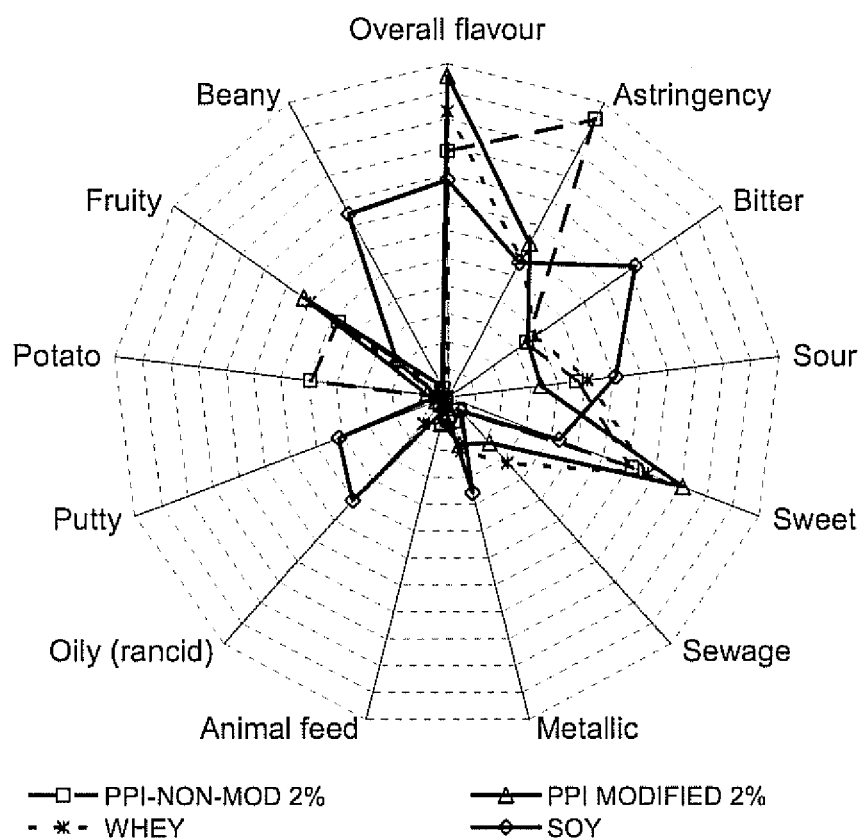

Figure 8: QDA tests statistical analysis of glycated LMW isolate vs. control and reference proteins

| Analysis | PPI NON-MOD 2% | PPI MODIFIED 2% | WHEY | SOY | Proba |
|---|---|---|---|---|---|
| Overall flavour | 44.27 | 57.82 | 51.36 | 39.09 | 0.0034 |
|  | B | A | AB | B | ** |
| Astringent | 56.64 | 31.36 | 28.27 | 27.45 | 0.0001 |
|  | A | B | B | B | *** |
| Bitter | 17.27 | 17.55 | 19.27 | 41.18 | 0.006 |
|  | B | B | B | A | ** |
| Sour | 23.36 | 16.82 | 25.27 | 30.45 | 0.0082 |
|  | AB | B | AB | A | ** |
| Sweet | 35.55 | 45.27 | 38.55 | 21.45 | <0.0001 |
|  | A | A | A | B | *** |
| Sewage | 3.09 | 11.18 | 16 | 3.45 | 0.0787 |
|  | ! | ! | ! | ! |  |
| Metallic | 4.55 | 8.91 | 10 | 17.82 | 0.0023 |
|  | B | B | AB | A | ** |
| Animal Feed | 5.27 | 4.64 | 1.82 | 2 | 0.5004 |
|  | ! | ! | ! | ! |  |
| Oily(rancid) | 2 | 1.27 | 6.45 | 25.09 | 0.0007 |
|  | B | B | B | A | *** |
| Putty | 0.36 | 2.09 | 1.73 | 20.73 | 0.0012 |
|  | B | B | B | A | ** |
| Potato | 24.55 | 3.73 | 1.82 | 1.73 | 0.0009 |
|  | A | B | B | B | *** |
| Fruity | 23.64 | 31.18 | 29.82 | 11 | <0.0001 |
|  | A | A | A | B | *** |
| Beany | 1.82 | 2.18 | 0 | 37.27 | <0.0001 |
|  | B | B | B | A | *** |

* significant at 5%
** significant at 1%
*** significant at 0.1%

NON-ASTRINGENT PROTEIN PRODUCTS

This application is the U.S. National Phase of, and Applicants claim priority from, International Patent Application Number PCT/NL2010/050756 filed 12 Nov. 2010 and European Patent Application Number 09175963.9 filed 13 Nov. 2009 which are incorporated herein by reference in their entirety.

BACKGROUND OF THE INVENTION

The invention is directed to a glycated potato protein, a food product comprising a glycated potato protein, an additive comprising a glycated potato protein and a method for preparing a glycated potato protein.

The ingestion of certain foods is associated with a dry, puckering sensation in the mouth known as astringency. An astringent taste may alternatively be described as a peculiar smell or an unpleasant taste, thereby giving a filmy mouthfeel and graininess. Astringency tastes unpleasant to many mammals, including humans. It has been proposed that astringency is associated with the interaction of certain compounds with salivary proteins in the mouth. Compounds may for example denature, bind and/or precipitate the salivary proteins, thus causing the astringent taste.

Some protein-containing food products are known to have astringency, in particular when such food products are acidic. Known examples of such food products are protein-containing acidic foods or drinks such as fermented milk beverages and other sour milk beverages and also sports drinks. The degree of astringency in protein-containing food products may vary depending on the type of protein used.

A further problem of protein-containing food products is the solubility of the protein. Especially at low pH, protein tends to precipitate due to decreased solubility in the liquid. This may lead to a stronger astringent taste. Furthermore, in certain aqueous drinks, such as sports drink and soft drinks, a suspension is often regarded by the customer as unappealing.

Whey proteins are generally preferred for use in acidic protein-containing food products for several reasons. Compared to most other proteins, whey proteins have a relatively mild astringent taste. Furthermore, whey proteins have a good solubility in water, although precipitation still occurs in solutions with a very low pH (e.g. a pH lower than 4). Because of the good solubility, whey protein may also be used in clear and/or transparent beverages.

There are however some disadvantages of using whey protein in food products. First, whey protein has a taste of its own which is often experienced as unpleasant. Furthermore, some people are allergic to whey protein. Whey protein is further not suitable in a vegan diets, since it is produced from milk-products. Also, whey proteins are relatively expensive.

Methods are known in the art to relieve the astringency of an aqueous solution comprising dissolved proteins by modification of the proteins. Examples of such protein modification methods are phosphorylation, hydrolysis, transglutamination and glycation. A disadvantage of such methods is that the modification may often lead to a decreased solubility of the protein in the solution, a change in colour in the solution and/or an undesirable flavour (off-taste) of the solution.

EP-A-1 698 239 describes an acidic food or drink comprising an acidic-soluble protein and one or more of salts or saccharides selected from the group of astringency relieving agents consisting of water-soluble polysaccharides, water-soluble basic salts, alkali metal salts of organic acids, basic monosaccharides and basic oligosaccharides. The presence of the one or more salts or saccharides is said to relieve the astringency of the food or drink. An example of a suitable saccharide is maltodextrin. An acidic protein beverage according to EP-A-1 698 239 may be prepared by adding a powder material containing the acidic-soluble protein and the one or more of salts or saccharides as a raw material to a beverage.

A disadvantage of the method described in EP-A-1 698 239 is that the astringency relieving agents mentioned are not all able to suitably decrease the astringency of all protein solutions. For example, it was found that maltodextrine was unable to suitably decrease the astringency of a potato protein solution. Furthermore, a disadvantage of using a basic monosaccharide or a basic oligosaccharide as an astringency reducing agent is that an uncontrolled Maillard reaction may occur between the protein and these sugars, which may lead to an off-taste and/or undesirable, usually brown, colouring of the solution. A further disadvantage is that the solubility of the protein may be decreased by addition of reducing sugars.

WO 2009/117572 discloses a method for producing protein-polysaccharides conjugates comprising reacting a polysaccharide comprising a reducing sugar and a protein in an aqueous solution comprising 10-14% (w/v) polysaccharide and 1-30% (w/v) protein at a temperature of 40-120° C. Thus, the method makes use of a wet heat treatment. The protein may be a whey protein or a soy protein and the polysaccharide comprises a reducing sugar that may be chosen from the group of glucose, fructose, glyceraldehyde, lactose, arabinose, maltose, maltodextrin and dextran.

BRIEF DESCRIPTION OF THE DRAWINGS

FIG. 7 is a graph showing the QDA scores of glycated isolate versus control and reference proteins. The QDA attribute scores show that the glycated acidic eluted LMW protein (sample 2) has an overall better flavour score compared to samples 1, 3 and 4. The glycated acidic eluted LMW protein scored significantly better on astringency 30 compared to the non-modified potato protein sample (sample 1).

FIG. 8 is a table showing the QDA tests statistical analysis of glycated LMW protein isolate vs. control and reference proteins.

DETAILED DESCRIPTION OF THE INVENTION

Figure 1:
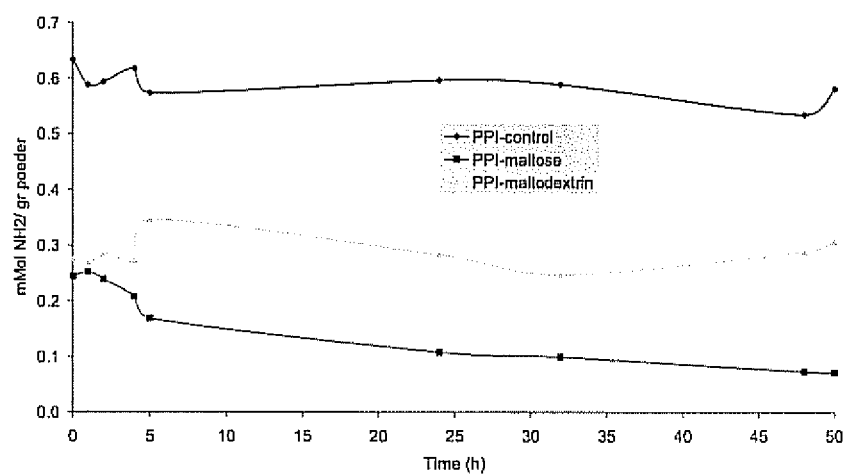
FIG. 1 is a graph showing the result of an experiment demonstrating that maltose is suitable for glycation of a potato protein, whereas maltodextrin is not suitable for glycation of a potato protein.

An object of the invention is to provide a protein that can be added to a food product or beverage without thereby providing the food product or beverage with a strong astringent taste, an undesirable colouring and/or an off-taste.

A further object of the invention is to provide an acidic food product or beverage comprising a protein that does not or at least not substantially contribute to the taste or colour of the acidic food product or beverage.

A further object of the invention is to provide a beverage comprising a protein, which protein does not or only substantially contribute to the taste, colour and/or clarity of the beverage and which protein has a good solubility in the beverage.

One or more of the problems described hereinabove were solved by providing a potato protein glycated with a reducing sugar, wherein the reducing sugar is preferably chosen from the group consisting of reducing monosaccharides, reducing disaccharides, dextran and combinations thereof. This compound is hereinafter referred to as glycated potato protein.

More specifically, the invention is directed to a potato protein, wherein at least part of the reactive amino groups present in the potato protein are bound to a reducing saccharide through an imine bond, wherein the reducing sugar is preferably chosen from the group consisting of reducing monosaccharides, reducing disaccharides, dextran and combinations thereof. The reactive amino groups present in a protein are the amino groups in lysine, asparagine, glutamine and arginine residues and also the NH group in histidine. The NH groups in the amide bonds in the backbone of the protein are not considered reactive amino groups.

It was found that the astringent taste of a potato protein could be reduced by glycation of the potato protein with a reducing monosaccharide or a reducing disaccharide, while maintaining the desirable properties of the potato protein. These properties include good solubility and lack of noticeable taste and/or smell. Furthermore, low molecular weight potato protein isolates were found to be very stable at low pH compared to proteins of an origin other than potato.

DETAILED DESCRIPTION OF THE INVENTION

Without wishing to be bound by any theory, it is believed that one of the key processes leading to astringency is precipitation of the salivary proteins on the surface of the tongue or the oral cavity. Such precipitation is believed to be caused by interactions between food proteins and the salivary proteins. In general, salivary proteins are proline rich and have a low isoelectric point (IEP), whereas food proteins often have a higher IEP. These food proteins may be positively charged, especially at low pH, and therefore prone to interact with the negatively charged saliva proteins in the mouth, resulting in salivary/food protein complexes that precipitate causing astringent sensations.

It was found that by glycation of a protein with a reducing saccharide, the number of positive charges of a protein may be reduced. The positive charges of potato proteins may be caused by protonated amino groups ($NH_3^+$). During glycation, the reducing saccharides may form a covalent bond with amino groups ($NH_2$) of the potato protein. Such a protein modification thus decreases the number of possible positive charges the potato protein may have and therefore reduces the tendency of the potato protein to interact with the saliva proteins and possible precipitation and thereby reduces the astringency of the potato protein.

The choice for using potato proteins has several advantages over other proteins known in the art, such as the often used whey protein. Potato proteins do not have a strong noticeable taste or smell of its own. Therefore, it does not contribute, or at least not substantially, to the taste or smell of the products to which the potato proteins are added. Furthermore, potato proteins have a good solubility and do not provide a noticeable colour to a solution when dissolved. Furthermore, no common allergies are related with potato proteins and are further suitable in a vegan diet. Native potato proteins can be easily obtained and are relatively cheap.

It was surprisingly found that glycation of the potato proteins with the reducing saccharides of the invention did not have a negative effect on the solubility, the colouring or the taste of the potato proteins. Furthermore, glycation of potato proteins provides a way to control the charge of the proteins and thereby control properties such as taste, viscosity, gelling behaviour, foaming behaviour and emulsification properties. This is for example shown in example 12.

The term "potato protein" as used herein refers to a protein that can be derived from a potato, such as patatin or protease inhibitors. The potato protein preferably is a native potato protein.

The term "native potato protein" as used herein refers to a potato protein without any significant physical or (bio)chemical modification or inactivation, in particular denaturation.

The term "glycation" as used herein refers to the chemical reaction between a reactive amino group of a protein and an aldehyde or ketone group of a reducing saccharide. This reaction is described in S. K. Grandhee, V. M. Monnier Jun. 25, 1991 The Journal of Biological Chemistry, 266, 11649-11653. According to March (1985) "Advanced Organic Chemistry reactions, mechanisms and structure" (3rd ed.). New York: John Wiley & Sons, inc. ISBN 0-471-85472-7, the correct (IUPAC) nomenclature for such a reaction is "alkylimino-de-oxo-bisubstitution". Furthermore, a more general reaction between an aldehyde and an amine has been described by McMurry (McMurry, Organic Chemistry (1996), 4th edition, Pacific Grove (USA): Brooks/Cole Publishing company, ISBN 0-534-23823-7, p. 733-734 and 1138). The mechanism behind this general reaction also applies to the more specific glycation reaction used in the invention.

The reactive amino groups of a potato protein in a glycation reaction comprise the amino groups in lysine, asparagine, glutamine and arginine residues. These reactive amino groups may form an imine bond with a reducing saccharide in a glycation reaction. Furthermore, the researchers believe that the NH group in histidine residues of a protein may also be a reactive amino acid group, which may form an enamine bond when reacted with a reducing saccharide.

The terms "potato protein glycated with a reducing saccharide" and "glycated potato protein" are used interchangeably.

The terms "reducing sugar" and "reducing saccharide" may be used interchangeably and, as defined herein, refer to a saccharide that has a free aldehyde or ketone functional group when being dissolved in an alkaline solution, thereby allowing the sugar to act as a reducing agent. Reducing sugars include monosaccharides, such as glucose, fructose, glyceraldehyde, galactose, xylose, ribose and arabinose; and disaccharides, such as lactose and maltose. Monosaccharides comprising a ketone group are known as ketoses. Monosaccharides comprising an aldehyde group are known as aldoses. Sucrose and trehalose are not reducing sugars.

Preferably, the reducing saccharides have a degree of polymerization of 5 or lower, more preferably of 3 or lower. Most preferably, the reducing saccharide is a reducing disaccharide. Examples of suitable reducing disaccharides are maltose and lactose. It is believed that glycation of a potato protein with a reducing saccharide having a degree of polymerization (DP) of three or larger, i.e. trisaccharides and larger oligosaccharides, are less efficient in decreasing the astringency of potato proteins. Without wishing to be bound by any theory, it is expected that this is caused by a limited accessibility of the amino groups of the protein by large saccharides, i.e. saccharides having a DP>2. This limited accessibility may lead to a lower reactivity between the saccharides and the potato protein and/or even to a lower possible percentage of amino groups in the potato protein that can be glycated with a saccharide.

The structure of a glycated protein is known in literature and is for example described in Vlassara, H., Bucala, R. & Striker, L. (1994) Lab. Invest. 70, 138-151 and also in S. K. Grandhee, V. M. Monnier Jun. 25, 1991 The Journal of Biological Chemistry, 266, 11649-11653.

A glycated potato protein according to the invention is very suitable as a protein ingredient in a beverage. It has a good solubility in water and does therefore not cause the beverage to become a suspension. When dissolved in a beverage, the glycated potato protein has no effect or at least no substantial effect on the colour, taste or clarity of the beverage when dissolved in the beverage.

Glycated potato protein has a number of advantages, in particular regarding solubility, colour and/or clarity. Glycated potato proteins may be soluble in aqueous liquids at low pH values, e.g. at pH values between 3 and 6. When dissolved in water at a pH of 3.0, no precipitate was formed within 2-3 weeks. Furthermore, glycated potato proteins dissolved in an aqueous liquid may not have any, or at least no substantial, effect on the colour of the aqueous liquid. Furthermore, glycated potato proteins dissolved in an aqueous liquid may not have any, or at least no substantial, effect on the clarity of the solution, which means substantially no precipitate is formed and substantially no cloudiness or haziness is formed (turbidity).

Preferably, at least 40% of the reactive amino groups in the potato protein are glycated with a reducing sugar, more preferably at least 60%. This may be measured by the orthophtalaldehyde method, as described in example 5. A too high degree of glycation may however result in a decrease in solubility of the potato protein, in particular when xylose is used. Furthermore, a too high degree of glycation may lead to undesirable Maillard reactions. Therefore, preferably less than 90%, more preferably less than 80% of the reactive amino groups in the potato protein are glycated with a reducing sugar.

At least 15 wt. % of the glycated potato protein may consist of reducing saccharide residues, for example at least 30 wt. %. These values are especially applicable for reducing monosaccharides. In case of reducing disaccharides, at least 30 wt. % of the glycated potato protein may consist of disaccharide residues, for example at least 60 wt. %. However, in view of functional properties, the amount of reducing saccharide may be smaller, as explained below for the method of the invention. Consequently, the amount of saccharide moieties in the glycated protein may be 0.7-50 wt. %, preferably 3-30 wt. %, even more preferably 5-15 wt. %, based on the total weight of the potato protein moiety of the glycated protein.

The potato protein used in the invention may be a low molecular weight (LMW) potato protein having a mean molecular weight of below 40 kDa, more preferably below 35 kDa, even more preferably 5-30 kDa, for example 20-30 kDa. Furthermore, the LMW potato protein is preferably a protease inhibitor. The LMW potato proteins, in particular the LMW protease inhibitor, are desirable, because they have a high solubility and stability, even in solutions with low pH, and have a high nutritional value (based on amino acid composition and digestibility). Furthermore, due to their compact structure and various intramolecular disulfide bridges, LMW potato protein and protease inhibitor are very stable at low pH.

The potato protein used in the invention may also be a high molecular weight (HMW) potato protein having a molecular weight larger than 35 kDa. Typically, HMW potato protein has a mean molecular weight of 40-50 kDa, in particular 40-45 kDa.

The potato protein may be a native potato protein. The potato protein may be also a potato protein hydrolysate.

Potato proteins can tentatively be divided into the following three classes: (i) the patatin family, highly homologous acidic 43 kDa glycoproteins (40-50 wt. % of the potato proteins), (ii) basic 5-25 kDa protease inhibitors (30-40 wt. % of the potato proteins) and (iii) other proteins mostly high molecular weight proteins (10-20 wt. % of the potato proteins) (Pots et al., *J. Sci. Food. Agric.* 1999, 79, 1557-1564).

Patatin is a family of glycoproteins that have lipid acyl hydrolase and transferase activities and accounts for up to 40 wt. % of the total soluble protein in potato tubers. The patatin isolate of native potato protein comprises oxidases and lipase.

Protease inhibitors in potatoes can be divided into different groups based on their molecular weight. The different groups of protease inhibitors are identified as protease inhibitor I (molecular weight of about 39 kDa), carboxypeptidase inhibitor (molecular weight of about 4 100 Da), protease inhibitors IIa and IIb (molecular weight of about 20.7 kDa), and protease inhibitor A5 (molecular weight of about 26 kDa). The ratio of these different groups of protease inhibitors in the total potato protein depends on the potato variety.

The potato protein may originate from a native potato protein isolate, such as for example described in WO-A-2008/069650. Such a native potato protein isolate is preferably a protease inhibitor isolate. Potato protein protease inhibitor isolate is in general a fraction of whole potato protein that is enriched in protein protease inhibitor. The presence of protein protease inhibitor isolate in a food product of the invention can in particular be verified by an increased weight to weight ratio of protein protease inhibitor to patatin, compared to whole potato protein. Usually the weight to weight ratio of protein protease inhibitor to patatin is at least 80:20, preferably at least 85:15, more preferably 90:10.

The invention is further directed to a food additive comprising the glycated potato protein according to the invention.

A food additive according to the invention may be in the form of a powder. Such a powder typically comprises 40-100 wt. % glycated potato protein and has a water content of up to 15 wt. %, based on the total weight of the food additive.

A food additive according to the invention may further be in the form of a concentrated aqueous solution. The aqueous solution may comprise 0.5-10 wt. %, preferably 0.5-5 wt. % glycated potato protein, based on the total weight of the solution. The pH of such a solution may be 8 or lower, for example a pH of 3-6.

Reducing saccharide may also be present in the food additive, typically in an amount of 0-25 wt. %, based on the total weight of the food additive. The reducing saccharide may be unreacted saccharide from the glycation reaction.

The invention is further directed to a food product comprising the glycated potato protein according to the invention. In this regard, the term "food product" is intended to include both solid and liquid food products, such as beverages.

The food product may comprise 0.4-10 wt. %, preferably 0.5-4 wt. %, glycated potato protein, based on the total weight of the food product. The content of reducing saccharide in the food product may strongly vary from product to product. Since reducing saccharides such as maltose and lactose are food grade ingredients, such compounds are often also added to the food product. For example, glucose is often added for improving taste.

The food product may comprise an aqueous solution wherein the glycated potato protein is dissolved. In a preferred embodiment, the food product is a beverage. It was found that solutions comprising the glycated potato protein retain a high transparency even at potato protein concentrations above 1 wt. %, based on the total weight of the solution. Despite such high concentrations, no or substantially no precipitate or aggregate is formed in the solution, thus remaining a clear solution as opposed to a suspension.

The colouration of an aqueous solution wherein the glycated potato protein is dissolved may be measured by transmittance (absorbance) at 340 nm. Preferably, the transmittance of a solution at 340 nm is less than 0.2, based on a solution comprising 3.3 g/l glycated potato protein at pH 4.

The food product preferably is an acidic beverage, i.e. a beverage having a pH lower than 7. In acidic beverages, dissolved potato proteins are typically positively charged, which often results in an astringent taste of such beverages. However, this astringent taste is significantly decreased by the glycated form of the potato proteins of the invention. Furthermore, the glycated potato protein has a good solubility, even at low pH. As a result, the beverage may have a pH as low as 2.5 and still have a good taste and transparency. The beverage may be a soft drink, which drinks typically have a pH of 2.7-4.5. The beverage may further be a sports drink or an energy drink, which drinks typically have pH of 6-7.

A beverage according to the present invention is preferably a clear protein solution, wherein substantially no protein is precipitated.

A food product according to the invention may further be an acidic solid food product with relatively low water content. In this case, the glycated potato protein may be added as a powder.

The glycated potato protein or the food additive according to the invention may be prepared in a method for glycating a potato protein comprising reacting a potato protein with a reducing saccharide under dry or semi-dry conditions and a pH of 2-8. In particular, such a reaction is conducted as a dry or semi-dry powder, which powder comprises the potato protein and the reducing saccharide.

The pH of a dry powder or a semi-dry powder can be determined by preparing a 1% solution of the powder in water, based on the total weight of the solution, and subsequently measuring the pH of the solution by conventional means. For example, 0.5 gram of powder may be dissolved in 49.5 grams of water, thus obtaining a solution with a concentration of 10 g/L, after which the pH of the solution is measured.

Preferably, the potato protein and reducing saccharide are obtained by drying an aqueous solution having a pH of 2-8 comprising the potato protein and the reducing saccharide. In such a case, the pH of the reaction is determined by the pH of the aqueous solution prior to drying.

Using the method of the invention, the biological or enzymatic activity of the potato protein may be reduced, such as lipase and/or trypsin inhibitory activity. This may be advantageous in applications wherein the potato protein has not been subjected to a heat treatment. More in particular, such reduction in enzymatic activity may be advantageous in applications wherein potato protein is brought into contact with lipids or spices, such as mayonnaise, whipped creams, ice cream and meat.

However, glycation with sugars may also reduce functional properties of the proteins to be glycated. In particular, a heating step was found to have a negative effect on such properties. Besides the above-mentioned advantages of glycated potato proteins mentioned above, a further advantage of the method of the invention is that the glycation reaction may reduce the enzymatic activity of the potato protein, while the functional properties of the potato protein are, at least in part, maintained. Functional properties refers to physical properties of the protein, such as foaming properties, emulsifying properties, viscosity and gelation properties, as opposed to biological properties such as enzymatic activity.

Preferably, xylose is used as a reducing sugar. The inventors realized that the method of the invention in particular causes the potato protein to loose its functional properties when relatively high temperatures are used. The inventors further realized that when xylose is used as a reducing saccharide, the reaction temperature may be kept relatively low, preferably between 5 and 40° C., more preferably between 15 and 30° C. and even more preferably at room temperature. It was found that when potato protein was glycated with xylose, the lipase activity was significantly decreased, while at least in part maintaining its desirable foaming and emulsifying properties.

In particular, the method of the invention may be a method comprising the steps of
providing an aqueous protein solution comprising potato protein and a reducing saccharide, wherein the solution has a pH of 2.0-8.0 (for example a pH of 3-8; and
drying the aqueous protein solution, resulting in a semi-dry powder; and
incubating the semi-dry powder for 1-120 hours at 20-80° C. (for example 40-80° C.).

The incubation step corresponds to the reaction step wherein the protein is glycated. Furthermore, reducing sugars that are only moderately reactive in a Maillard reaction with potato protein are preferably used in the method of the invention. Examples of such reducing sugars are dextran and reducing disaccharides, such as maltose and lactose. A Maillard reaction is a reaction wherein a reducing sugar reacts with an amino group, e.g. an amino group from a protein, resulting in the formation of flavour compounds and colouring compounds, in particular brown colouring compounds. The flavour compounds may be recognized as the taste or smell of wet dog or wool. It may be clear that the presence of flavour and colouring compounds originating from a Maillard reaction in food products is in general undesirable for a neutral tasting protein product. Therefore, a Maillard reaction between the potato protein and the reducing saccharides should be prevented as much as possible, or should at least occur in a controlled way, e.g. at a slow rate. By using reducing sugars that are only moderately reactive in a Maillard reaction with potato protein, the Maillard reaction may be controlled or prevented.

The reducing saccharide may be chosen from the group consisting of reducing monosaccharide, reducing disaccharide, dextran and combinations thereof, and may in particular be a reducing disaccharide, for example maltose or lactose. Preferably, the reducing saccharide has a degree of polymerization lower than 3, i.e. the reducing saccharide is a reducing mono- or disaccharide, in particular when the reaction is conducted on a semi-dry powder. The accessibility of the reactive amino groups of the potato protein is too limited for saccharides with a higher degree of polymerization, which leads to a limited reactivity between the potato protein and the saccharides and a low efficiency of the glycation reaction. The effect of limited accessibility is especially reactions that occur in semi-dry form compared, wherein the reactivity between the ingredients may already be limited.

Monosaccharides may be less preferred due to uncontrolled Maillard reactions. For example, it was found that xylose en galactose would result in the formation of colouring agents.

Nevertheless, in a preferred embodiment, the reducing saccharide is xylose. As also explained above and in the experimental examples below, a potato protein that can be sufficiently glycated at low temperatures may have a reduced enzyme activity, but maintain its functional properties at least in part. Consequently, the glycation reaction preferably is conducted at low temperatures, such as 10-30° C. For this purpose, xylose was found to be a particular suitable reducing saccharide, which may be used to glycate a potato protein at room temperature (around 20° C.).

The aqueous protein solution provided in the first step preferably has a pH of 3-8, more preferably a pH of 3-5. At a pH lower than 3, the glycation reaction may become inefficient, resulting in a low yield of glycated potato protein. A pH higher than 5 may be undesirable, because the protein and the saccharide tend to react in an undesirable Maillard reaction. Furthermore, in case the end product is an acidic beverage, the use of a high pH during the glycation reaction will lead to the need of lowering the pH after the reaction has been conducted. Furthermore, dissolved potato protein isolate may precipitate at a pH higher than 5.

Preferably, the pH at which the reaction is conducted and/or the pH of the aqueous protein solution is such that the pH does not have to be adjusted afterwards, i.e. it has about the same pH as the final product. This is desirable in view of subsequent processing steps and may reduce the amount of salts used for adjusting the pH.

Optionally, after the glycation reaction, the powder is subjected to diafiltration. Diafiltration may reduce the amount of unreacted saccharides and ions in the solution and consequently lower the viscosity and prevent gel formation. This process is for example described in EP-A-1974615. A solution having low ionic strength and a low residual sugar concentration will typically not form a gel, even when heated at low pH, and thereby allows for stable clear drinks with high protein levels. When diafiltration is conducted, the pH of the aqueous protein solution is preferably set at the intended pH of the end product, e.g. 3.5-4.5 for acidic beverages, as to reduce the amount of salt that is formed when adjusting pH values for the end product.

Although the glycation reaction is preferably conducted in semi-dry form, mixing the protein and saccharides is preferably conducted in solution. This is important for obtaining a good molecular mixture of the proteins and saccharides, i.e. an even distribution of these molecules throughout the mixture. Alternatively, it is also possible to conduct the mixing the protein and saccharides in dry form. However, such a method is not preferred, because the reaction of such a method would be less efficient.

Preferably, the reaction mixture comprises 2-28 wt. % (for example 3-15%), more preferably 7-13 wt. % (for example 5-10%), even more preferably 8-9 wt. % water. Therefore, the glycation reaction is said to be conducted under semi-dry conditions and the reaction mixture may be referred to as semi-dry. A water content of 8-9 wt. % corresponds to an atmosphere of 60% RH and 60° C. A water content above 28 wt. % is undesirable, because such a high content may increase the chance of undesirable fungal growth. If the reaction mixture is provided by drying the aqueous protein solution, such drying the aqueous solution may be done by any kind of drying, for example by freeze-drying or spray-drying. The protein-saccharide solution may be dried to 2-15%, preferably 5-10% moisture, based on the total weight of the semi-dry powder.

The pH of the glycation reaction and/or of the aqueous protein solution may be 2.0-8.0, preferably 2.5-6.5, for example a pH of 3-6. More in particular, in case glycation is conducted using a low molecular weight (LMW) potato protein, the pH of the reaction and/or the aqueous protein solution may be 2.0-8.0, preferably 2.0-4.0, even more preferably 2.5-3.5. In case glycation is conducted using a high molecular weight (HMW) potato protein, the pH of the reaction and/or the aqueous protein solution may be 4.0-8.0, preferably 5.0-7.0, even more preferably 5.5-6.5.

The amount of reducing saccharide used in the method the invention may be 0.7-200 wt. %, preferably 3-100 wt. %, based on the total weight of potato protein used. In view of maintaining the functional properties of the protein, a saccharide amount of 50 wt. % or lower is preferred. Such an amount will generally remove a sufficient amount of reactive amino groups from the potato protein, while the functional properties of the potato protein as well as its colour and smell are at least in part left intact. Consequently, the amount of reducing saccharide present in the method of the invention may be 0.7-50 wt. %, preferably 3-30 wt. %, even more preferably 5-15 wt. %, based on the total amount of protein present in the aqueous protein solution.

Alternatively, the protein to reducing saccharide weight ratio used in the method of the invention may be 3:1-1:2, preferably 3:1-1:1 (corresponding to 33-200 wt. % and 33-100 wt. % reducing saccharide respectively, based on the total weight of the potato protein).

Prior to the glycation reaction, the aqueous protein solution may comprise 1-40 wt. %, preferably 5-15 wt. % of potato protein and 1-40 wt. %, preferably 5-15%. reducing saccharide.

The glycation reaction or incubation step may be conducted for 1-120 hours and preferably for 40-60 hours. Such a time period allows the protein to react with the saccharide, such that after incubation most of the saccharide and protein are converted to glycated protein. The reaction may be conducted at a relative humidity (HR) of 20-80%, preferably of 40-70% and even more preferably of 55-65%. The reaction preferably takes place in a closed reaction vessel. This may be important for maintaining and/or controlling the desirable humidity and atmosphere. It may avoid the interaction of the aqueous protein solution with air, in particular with oxygen, which may lead to unwanted side reactions. For example, oxygen may give rise to oxidation reactions that lead to unwanted colouring and/or enzymatic reactions by oxidases (for example polyphenol oxidases) that may be present in the semi-dry powder.

The temperature at which the reaction takes place is 10-80° C. (for example 40-80° C. or 50-70° C. Glycation at temperatures higher than 80° C. may lead to unwanted Maillard reactions and/or microbial contamination. Lower temperatures may lead to an inefficient reaction due to the glass transition temperature of the dissolved saccharides. Nevertheless, for maintaining the functional properties of protein, a low incubation temperature is preferred, for example of 10-30° C.

In case of dry glycation, the temperature at which the glycation reaction takes place is preferably 10-60° C. Choosing a suitable temperature may depend on the type of reducing saccharide used. For example, in case of a disaccharide, the reaction temperature is preferably 40-60° C. In case the reducing saccharide is a C6 sugar, the reaction temperature is preferably 30-60° C., whereas in case the reducing saccharide is a C5 sugar, the reaction temperature is preferably 20-40° C. A C5 sugar may refer to a saccharide comprising a total number of carbon atoms that is a multiple of 5, such as 5 carbon atoms (for example xylose). A C6 sugar may refer to a saccharide comprising a total number of carbon atoms that is a multiple of 6, such as 6 carbon atoms (for example glucose) or 12 carbon atoms (for example maltose).

The glycated potato protein product obtained in the method of the invention may be used as an additive to any food product. It is often not necessary to remove any unreacted saccharide, because food products often contain saccharides from itself and the unreacted saccharide may thus be an additional saccharide ingredient in the food product. However, if the unreacted saccharides would somehow be undesirable, they may be removed using diafiltration and/or dialysis.

Successful glycation may be determined by measuring the availability of $NH_2$ groups in the potato proteins during glycation. Preferably at least 40%, more preferably at least 60% of the available $NH_2$ groups in the potato protein are reacted with a reducing sugar during the method of the invention. Such percentages give rise to a glycated potato protein with very desirable properties regarding solubility and astringent taste. Furthermore, preferably less than 90%, more preferably less than 80% of the available $NH_2$ groups in the potato protein are reacted with a reducing sugar. A too high degree of glycation may result in a decrease in solubility of the potato protein, in particular when xylose is used. Furthermore, a too high degree of glycation may lead to undesirable Maillard reactions. The amount of free $NH_2$ groups may be measured throughout the course of the glycation reaction. This measurement is based on the specific reaction between amine groups and ortho-phtalaldehyde (OPA, phthaldialdehyde, CAS 643-79-8) as shown in example 5. This method of measuring free $NH_2$ groups is in more detail explained in Interchim technical sheet FT-UP02727 and references therein, such as: Bertrand-Harb C., Nicolas M. G., Dalgalarraondo M., Chobert J. M., Science des aliments 1993, 13, 577-584).

The specificity and the rate of the glycation reaction depend on the non-protonated amino acid residues in the protein and the reactivity of the sugar moiety. The reactivity of the sugar moiety is enhanced by ring opening at elevated pH values.

Because of the mild reaction conditions used in the method of the invention, cross-linking of the proteins is avoided at least in part, such that the solubility of the proteins is not or substantially not decreased due to cross-linking.

Glycation preferably occurs without the controlling action of an enzyme. However, enzyme-controlled addition of a reducing saccharide to protein or lipid molecule, also referred to as glycosylation, may also be possible.

The potato protein used in the present invention may be obtained in a manner known per se. Existing methods for isolating potato proteins and potato protein fractions include fractionation, ion exchange, gel permeation, ultrafiltration, affinity and mixed-mode chromatography and fractionation by heat coagulation.

The potato protein used in the method may be dissolved in the solution in the form of a potato protein isolate or a potato protein fraction.

The native potato protein isolates used in the invention may be isolated according to any known process which yields a potato protein isolate with sufficiently high protein content. An example of a suitable isolation method is described in WO-A-2008/069650 of which the contents are hereby incorporated by reference. Herein a selective, mild, and efficient process for the isolation of native potato protein isolates and the different patatin and protease inhibitor fractions therein is described.

In an advantageous embodiment an isolate is present that is obtainable by a process for obtaining a native potato protein isolate, for example a native potato protein protease inhibitor isolate, comprising
  optionally subjecting potato fruit juice to a flocculation by a divalent metal cation, e.g. at a pH of about 7-9;
  centrifuging the flocculated potato fruit juice, thereby forming a supernatant;
  subjecting the supernatant to adsorption chromatography, in particular to mixed mode adsorption chromatography, operated at a pH of less than 11 and a temperature of 5 to 35° C. using an adsorbent capable of binding potato protein, thereby adsorbing the native potato protein to the adsorbent, which chromatography step can be carried out using various forms of adsorbents (which are known per se) using for example a fixed bed, an expanded bed or a membrane adsorber;
  eluting native potato protein isolate from the adsorbent with an eluent.

This process yields highly pure native potato protein isolate with a minimum of denatured protein and stable solubility. The native potato protein isolate can have an isoelectric point above 4.8, preferably above 5.5, and a molecular weight of below 35 kDa, preferably of 4-30 kDa.

The flocculated material that forms as a result of the treatment with the divalent metal cation at a pH of 7-9 can typically include negatively charged polymers, pectins, glycoalkaloids, and micro-organisms from the potato fruit juice. In particular, the removal of pectins and glycoalkaloids is advantageous, since these compounds adhere to the potato proteins and may cause flocculation. These compounds thus lead to an unstable protein isolate. Moreover, the presence of glycoalkaloids may give rise to an unpleasant off-taste, for example astringency caused by polyphenols.

A disadvantage of using proteins from a potato source is that often polyphenols are bound to the potato proteins, which are very hard to remove. This is also a disadvantage of the method described above for obtaining potato protein isolate.

Polyphenols, and in particular tannins, are known to be astringent compounds found in many fruits such as blackthorn, chokecherry, bird cherry and persimmon fruits, banana skins, and in potatoes. When consumed by mammals, tannins may denature the salivary proteins and/or aggregation of polyphenols with saliva proteins may occur, causing an unpleasant sensation in the mouth.

It was found that by eluting at low pH, the amount of polyphenols in the obtained potato protein isolate could be reduced. Therefore, the potato protein isolate is preferably eluted from the absorbent at a pH of 1-6, more preferably at a pH of 1.5-3.5, for example a pH of 2. In such a case, suitable eluents may be formic acid (HCOOH), hydrochloric acid (HCl) or phosphoric acid ($H_3PO_4$).

In an embodiment, first a patatin fraction is eluted using a first buffer with a pH of 4.5-7 and subsequently a protein fraction is eluted using a second buffer having a pH 1.5-4.5. The first buffer may comprise sodium citrate or sodium carbonate. The second buffer may comprise sodium formate.

The eluate may further be treated by ultrafiltration.

An advantage of the protein fraction obtained by elution at low pH is that this fraction may be directly used in the glycation method of the invention, without the need of any pre-treatment of the protein fraction.

The invention will be illustrated by the following non-limiting examples.

EXAMPLES

Example 1

Potato Protein Isolation 39.5 mL (50 cm bed height) of Fastline mixed mode adsorbent EBA resin (Upfront Chromatography) was equilibrated with 5 column volumes (CV) of 20 mM citrate buffer pH 4.8. Approximately 350 mL of potato fruit juice (AVEBE UA) was adjusted to pH 4.8 and loaded onto the column at a flowrate of 15 cm/minute. The fruit juice was washed away with 3 CV of water. Patatin was eluted using 5.5 CV of 15 mM citrate pH 6.0. The protease inhibitor fraction was then eluted in 5 CV of 50 mM phosphoric acid. Fractions were measured for volume and analysed for absorbences at 280 and 310 nm. The protease inhibitor fraction was concentrated by ultrafiltration on a 10 kDa MWCO membrane (Millipore) on a 200 mL Amicon UF unit operating at 3 Bar.

Further experiments were performed on semi-technical scale using an EBA column with an internal diameter of 30 cm loaded with 30 liters of Fastline mixed mode adsorbent EBA resin (Upfront Chromatography). Potato fruit juice was prepared on-site by grinding potatoes (cv. Festien) and separating the juice from the starch and fibre fractions. EBA chromatography was performed at ambient temperature using a flowrate of 15 cm/minute. The column was loaded with 7 column volumes of potato fruit juice at pH 4.8 and washed with 3 column volumes of water. Patatin was eluted using 6 column volumes of a 30 mM citrate buffer of pH 6.3. Protease inhibitors were eluted using 50 mM of formic acid (acidic elution).

This cycle was repeated 5 times, upon which the protease inhibitor fractions were pooled. The pooled PI fractions contained 5 g/L protein, 1.1° brix of dissolved material at a pH of 3.4 and a conductivity of 1.3 mS/cm at a total volume of 550 liters. The PI was subjected to ultrafiltration on a 5 kDa polyethersulphone membrane on a Koch UF unit at 3.5 bar to a final volume of 21 liters of 21.4° brix (corresponding to 168 g/L protein). This PI concentrated was then diafiltrated with 210 liters of water resulting in a protein concentrate of 22.3° brix (176 g/L protein) at a pH of 3.49 and a conductivity of 3.74 mS/cm. This solution was run over 2 activated carbon columns of 2 liters each, loaded with C-GRAN granular activated carbon (Norit) at a flowrate of 6 L/h. The resulting solution was spray dried and stored as powder until use.

Example 2

Protein Modifications on Potato Protein

The astringency of a low molecular weight protease protein isolate (LMW-PPI) was reduced using a number of different protein modification methods, viz. phosphorylation, glycation, hydrolysis and transglutamination.

For phosphorylation LMW-PPI was solubilized (40 g/l) in 0.1M sodium pyrophosphate buffer (pH 4.0) and freeze-dried. After incubation at 85° C. for 3 days to induce phosphorylation, samples were dialysed (6-8 kDa cut-off) to remove all non-bound pyrophosphate. Samples were freeze-dried for further analyses. A clear increase in phosphorus levels was found, which is indicative of a successful phosphorylation.

For glycation, LMW-PPI was solubilized at pH 8.0 in a 3:1 ratio with dextran or lactose and freeze-dried. After incubation at 60° C. and 60% RH for ~50 h to induce glycation, the samples were dialysed (6-8 kDa cut-off) to remove all non-bound dextran or lactose. Samples were freeze-dried for further analyses. The availability of $NH_2$ groups of the protein was then determined. Glycation, both with lactose and with dextran, gave a clear reduction of available $NH_2$ groups, indicative of a successful glycation.

For hydrolysis, flavourzyme, which is a commercially available protease-complex specifically applicable for debittering of hydrolysates, was used. Flavourzyme consists of several endoproteases and exopeptidases, of both amino- and carboxyl-peptidase types. 5% LMW-PPI solutions (pH 7.2) were treated with Flavourzyme (40 U/g protein, 50° C.) for 6, 30, 124, 430 and 1357 minutes. Samples were adjusted to pH 5.0 to inactivate Flavourzyme. Samples were freeze-dried for further analyses. It was found that hydrolysis resulted in increased available $NH_2$ groups (increased peptide/amino acid amino-termini) which is indicative of successful hydrolysis.

For transglutamination 2.5% LMW-PPI solutions (pH 7.0) were treated with transglutaminase (10 or 20 U/g protein, 5° C.) for 4, 8 and 24 h. Transglutaminase was inactivated for 5 min at 80° C. and samples were freeze-dried for further analyses.

Example 3

Solubility

The effects of glycation on potato protein solubility at low pH were investigated by visual inspection of a number of model beverages. Each model beverage comprised 50 mM NaCl solution at pH 3.0 and, to which 2 wt. % modified LMW-PPI and 5 wt. % sugar were added. The modified protein used was that obtained in example 2: phosphorylated protein (1), dextran glucated PPI (2), lactose glucated PPI (3), hydrolyzed PPI (4) and transglutamine treated PPI (5). A control beverage (6) was made comprising non-modified LMW-PPI instead of modified LMW-PPI. The model beverages were visually inspected for solubility and transparency. The model beverages were then heated to 80° C. for 5 minutes and then again visually inspected.

It was thus found that glycation (both dextran and lactose) and hydrolysis did not negatively affect LMW-PPI-solubility. Phosphorylated and transglutamine treated LMW-PPI formed stable dispersed particles in the model beverages, which make these proteins unsuitable for use in food products.

Example 4

Astringency at Low pH

To obtain an impression of the astringency, model beverages (1)-(5) and control beverage (6) from example 3 were judged during a tasting session. All model beverages were perceived as less astringent than control beverage (6) comprising the non-modified LMW-PPI. Model beverages (1) and (4) showed an undesirable off-flavour compared to the control beverage. It was found that the glycated LMW-PPI beverages (model beverages (2) and (3)) was perceived as the least astringent beverage and also did not have any noticeable off-flavours compared to the control beverage.

Example 5

Availability of $NH_2$ Groups

The availability of $NH_2$ groups during glycation at pH 8.0 was measured for several potato protein samples in three separately conducted experiments (5a-5c). The method for glycation used was similar to that in example 2, but with a ratio of protein:sugar of 1:1.

In experiment 5a the following three samples were tested: PPI (control, no glycation), PPI with maltose and PPI with maltodextrine.

In experiment 5b the following three samples were tested: PPI (control, no glycation), PPI with fructose and PPI with glucose.

In experiment 5c the following samples were tested: PPI (control, no glycation), PPI+fructose, PPI+glucose, PPI+galactose, PPI+sorbitol, PPI+sucrose and PPI+xylose.

The experiments for measuring the availability of $NH_2$ groups during glycation were conducted as follows.

A stock solution of ortho-phtalaldehyde (OPA, SigmaAldrich, 00681) was prepared by dissolving 5 mg of OPA in 100 µL of 96% ethanol. 5 µL of 2-mercaptoethanol (Merck, 8.05740.0250)) was added. When all material was dissolved in the ethanol, 10 mL of a 100 mM carbonate buffer at pH 10.5 were added. This reagent was stored away from direct light and used within the hour.

The samples were prepared by making 0.33% (w:v) solutions from the potato protein samples and adding 100 µl of such a sample to 1 mL of the OPA stock solution. The thus obtained samples were incubated in the dark for exactly 1 minute and 30 seconds, upon which the absorbence at 340 nm was read using a BioRad SmartSpec plus spectrophotometer.

Quantification was performed by comparing the glycated protein solutions against a calibration curve prepared from an acetyllysine (SigmaAldrich, A2010) standard solution.

The result of experiment 5a is depicted in FIG. 1. This experiment shows that maltose is suitable for glycation of a potato protein, whereas maltodextrin is not suitable for glycation of a potato protein.

Figure 2:
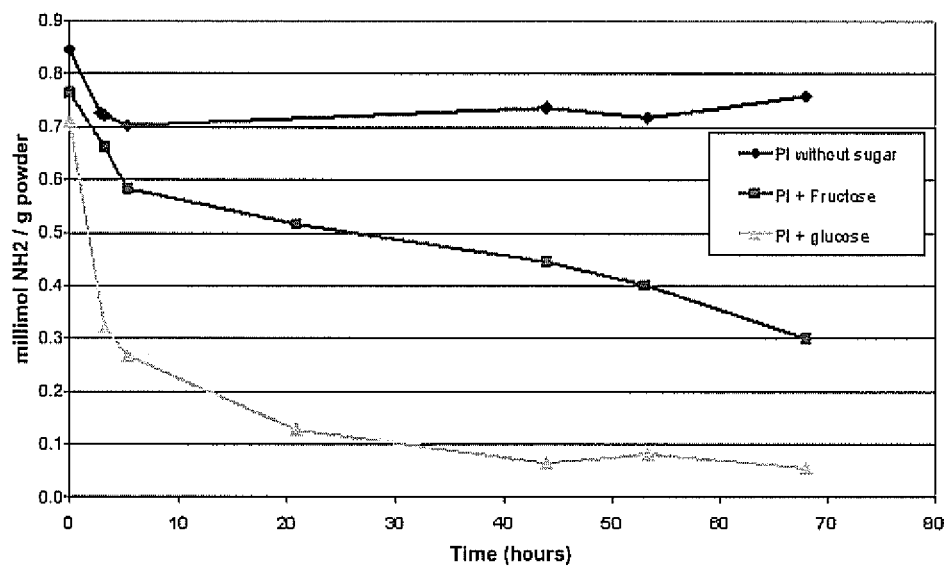
FIG. 2 is a graph showing the result of an experiment demonstrating that fructose and glucose are both suitable reducing saccharides for glycation of potato proteins.

The result of experiment 5b is depicted in FIG. 2. This experiment shows that fructose and glucose are both suitable reducing saccharides for glycation of potato proteins.

Figure 3:
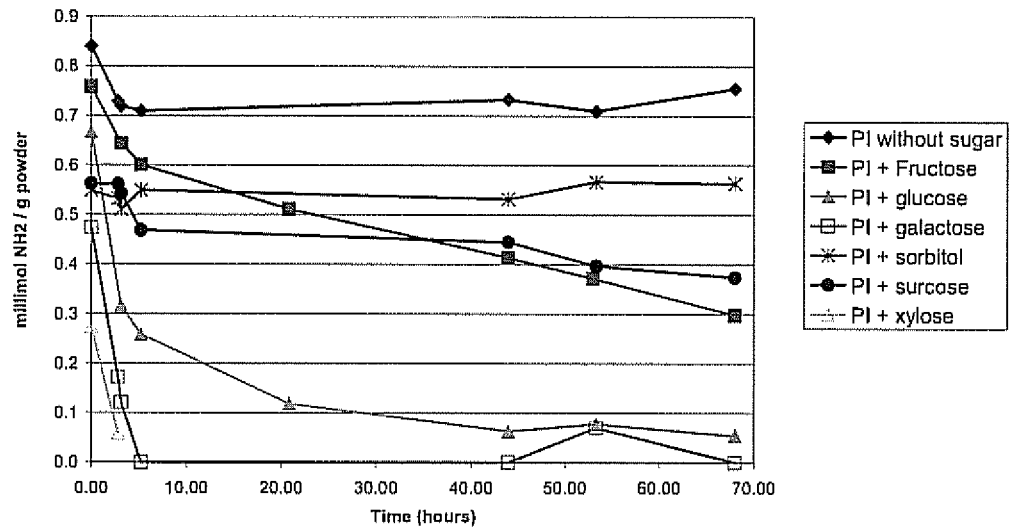
FIG. 3 is a graph showing the result of an experiment demonstrating that glucose and galactose samples are better reducing saccharides than the other samples tested.

The result of experiment 5c is depicted in FIG. 3. Experiment 2c shows that the glucose and galactose samples are better suitable reducing saccharides than the other samples tested in this experiment.

Example 6

Sensory Evaluation

The taste of model beverages comprising the protein samples shown in table 1 were compared in a sensory analysis by a test panel of 11 people. The potato protein isolates were obtained using the method described in example 1, except for a difference in the pH of the eventual eluent used for eluting the potato proteins from the column. The potato protein isolate in samples 1 and 2 were subjected to the glycation method (with a protein:sugar ratio of 1:1), but only to sample 2 actually was added a reducing saccharide. Sample 1 thus functions as the control.

From each isolate, three model beverages were prepared by adding the isolate in different protein concentrations, viz. a concentration of 0.1 wt. %, 0.2 wt. % and 0.4 wt. %, based on the total weight of the standard beverage. The beverage contained 50 mM NaCl and the pH was adjusted to 3.4 with phosphoric acid. The solutions were heated for 5 minutes at 80° C.

TABLE 1 protein isolates used in the model beverages

| PPI isolate | protein origin | Glycation | pH elution buffer |
|---|---|---|---|
| Control | potato protein | without saccharide | 11 |
| Maltose | potato protein | Maltose at pH 8.0 | 11 |
| elution at low pH | potato protein | No | 3.6 |
| non-treated | potato protein | No | 11 |

In a quantitative description analyses (QDA), sensory assessment of model beverages were evaluated by a food research's expert panel of 11 panelists. The attributes on which the panelists scored were attributes as determined by the panel in a training session. During this training session the panel was calibrated for astringency using a range of concentrations and noticeable off-flavours associated with the protein samples were determined (table 2). A statistical analysis (ANOVA) was conducted after the test in which was shown that the five attributes were significantly different. During the training two reference samples that were submitted to the glycation procedure without added carbohydrates, PPI control 0.1 wt. % and PPI control 0.6 wt. %, were selected as 'astringent' calibration references with the values 15 and 60, respectively. These reference samples were present during the assessment to act as anchor points for the attribute 'astringent'. All attributes were scored on a scale from 0-100. Furthermore, the panelists had the opportunity to make free remarks for each sample in order to express any other description they found appropriate. Three concentrations at which the panel decided astringency was best quantified were selected for detailed scoring on all attributes. First the higher concentration (0.2 wt. % and 0.4 wt. %) samples were presented blind and at room temperature of 20-25° C. in a random order to the panel. Thereafter the lower concentration (0.1 wt. %) samples were presented in the same way. This was done in order to assess sense fatigue and adaptation after the first eight samples. Eventually, evaluation of the last four samples (0.1 wt. %) was conducted as well.

TABLE 2

Attributes as determined for the sensory QDA test

| Attributes | Group | Definition |
|---|---|---|
| Astringent | Mouthfeel | A rough, dry sensation in the mouth/on teeth like when eating spinach, rhubarb |
| Sulphur | Flavour | Sulphur associated flavours, e.g. cabbage, sewage, matches (flavour is associated with protein, sulphur containing amino acids) |
| Wet dog/wool | Flavour | Flavour associated with wet fur of dogs or wet woolen socks (flavour is typical for heated protein samples and associated with Maillard-based flavours) |
| Seawater/oily | Flavour/ Mouthfeel | Flavour associated with seawater (brackish) and also the soft feeling of seawater and/or oil in the mouth (likely these characteristics originate from the salty/low pH matrix) |
| Cardboard | Flavour | Flavour associated with (wet) cardboard and putty (this flavour is associated with oxidation) |

Overall the profile of the control and the non-treated PPI were similar, suggesting that the glycation itself (i.e. dry heating under humid conditions) does not affect astringency itself. Most likely, the covalent interaction between the PPI and saccharides contributes to a reduced charge at low pH, thereby decreasing the interactions with the predominantly negatively charged salivary proteins.

Astringency of the PPI-control sample at 0.1% was scored by the panel at ~23, non-treated PPI at 0.1% was scored at ~22 and glycated PPI-maltose at 0.4% was scored at ~20. These results demonstrate that, compared to the control, at least 4 times more glycated PPI-maltose can be added without increasing astringency, confirming the previous results that glycation is an effective strategy to reduce overall astringency of potato protein.

Furthermore, compared to non-treated PPI, the low pH elution sample displayed a reduced astringency at lower concentration (0.1 wt. % and 0.2 wt. %), whereas at a higher concentration (0.4 wt. %) astringency was similar.

Example 7

Sensory Evaluation 2

Figure 4:
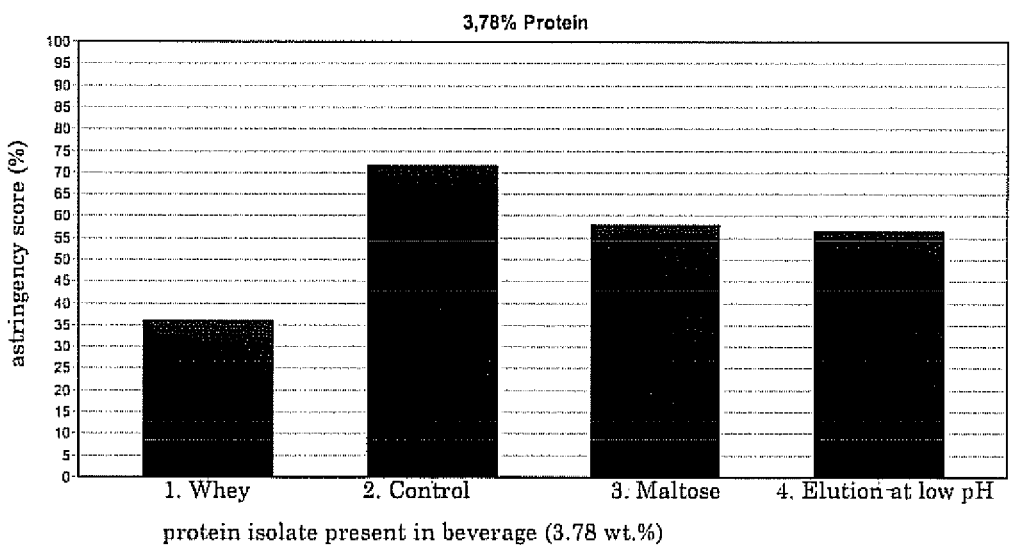
FIG. 4 is a graph showing the result of an experiment in which model beverages comprising the protein isolates shown in table 3 were tested in a sensory evaluation test.

In an experiment similar to example 6, model beverages comprising the protein isolates shown in table 3 were tested in a sensory evaluation test with a QDA test panel. The model beverages were prepared with the ingredients shown in table 4. The concentration of the isolate in the model beverage was 3.78 wt. %. The results are shown in FIG. 4.

TABLE 3 protein isolates used in the model beverages

| sample | protein origin | glycation | pH elution buffer |
|---|---|---|---|
| 1 | whey protein isolate* | no | n.a. |
| 2 | potato protein | no | 11 |
| 3 | potato protein | Maltose at pH 8.0 | 11 |
| 4 | potato protein | No | 3.6 |

*Whey protein isolate Bipro Davisco Foods International inc, USA

TABLE 4

Beverage protocol

| Ingredient | wt. % |
|---|---|
| Sugar | 4.60 |
| Glucose | 4.06 |
| Sodium benzoate | 0.0196 |
| Trisodium citrate | 0.0659 |
| Potassiumhydrogene phosphate | 0.0392 |
| Magnesium L-lactate hydrate | 0.0589 |
| Sodium chloride | 0.0238 |
| Ascorbic acid | 0.0098 |
| Strawberry flavour | 0.1 |
| Protein | 0.4-5 |
| Phosphoric acid | * |

* added in such an amount to obtain a beverage of pH 3.4

Example 8

Effect of pH on Glycation

Figure 5:
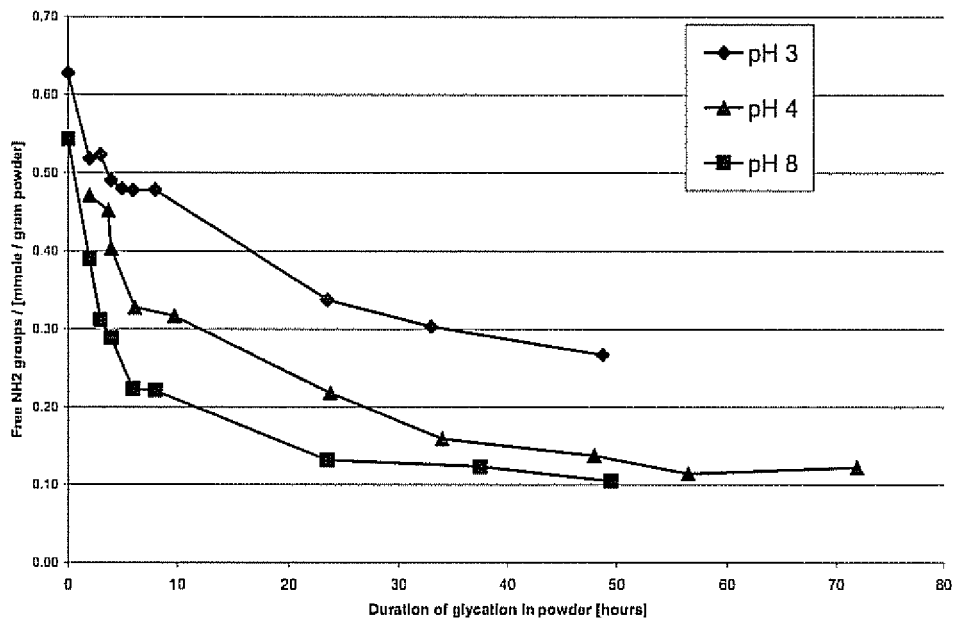
FIG. 5 is a graph showing the result of an experiment demonstrating that the degree of glycation of an LMW potato protein with maltose at pH 3 is not as high as that of pH 4 or 8, but nevertheless still acceptable.

The effect of pH on glycation of an LMW potato protein with maltose was determined by measuring the availability of free $NH_2$ groups as described in example 5. The $NH_2$ availability was measured at a pH of 3, 4 and 8. The results of this experiment are depicted in FIG. 5.

This experiment shows that the degree of glycation at pH 3 is not as high as that of pH 4 or 8, but nevertheless still acceptable.

Example 9

Colour Formation of Glycated Proteins with Various Sugars

Potato protein isolate was glycated with the reducing sugars shown in table 5. The glycation reaction was conducted according to the method of the invention using an incubation time of 68 hours in a solution at a pH of 4.

Colour formation during the glycation reaction was followed by measuring the adsorbence at 340 nm of the protein solution in a 100 mM carbonate solution at pH 10.5.

This experiment shows that glycation of potato proteins with maltose, lactose, fructose, glucose, sorbitol and sucrose does not lead to considerable colour formation. However, galactose does lead to considerable colour formation, while a precipitate was formed in the xylose glycation sample.

TABLE 5

| Saccharide | Absorbance (%) |
|---|---|
| Blank | 0.009 |
| Maltose | 0.126 |
| Lactose | 0.021 |
| Fructose | 0.014 |
| Glucose | 0.052 |
| Galactose | 0.452 |
| Sorbitol | 0.022 |
| Sucrose | 0.024 |
| Xylose | >0.159** |

*colour reading after 3 hours (insoluble proteins were formed in the xylose sample after 3 hours incubation).

Example 10

QDA Comparison with Whey Protein

A quantitative description analysis (QDA) testing, similar to the one described in example 6, was performed to compare the astringency of three potato protein samples and a whey protein sample. The samples were dissolved in varying concentrations in a sports drink and then tested.

The following samples were tested:
  sample 1 (306P base isolate non-modified): non-modified LMW isolate obtained by a method similar to that described in example 1, but with elution at high pH (~11);
  sample 2 (306P base+maltose glycated): 306P base isolate, glycated with maltose at pH 8.0;
  sample 3 (low pH eluted non-modified: non-modified LMW isolate obtained by the method described in example 1 at low pH elution;
  sample 4 (WPI Bipro): a whey protein isolate obtained from Davisco Foods International inc, USA.

Figure 6:
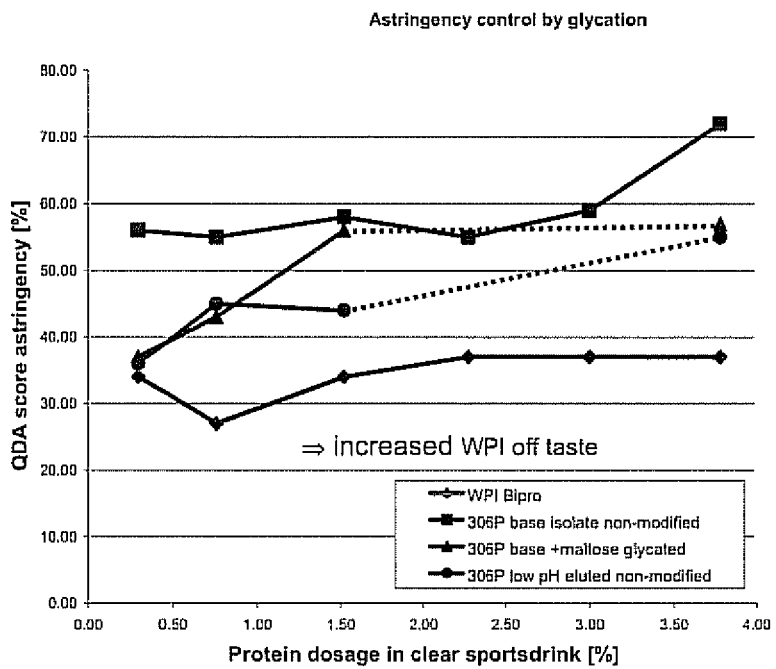
FIG. 6 is a graph showing the result of the experiment comparing the astringency of three potato protein samples and a whey protein sample. It was shown that sample 4 (whey protein) shows a constant astringency score at high concentrations, but with an increased off taste in other attributes. Sample 3 (elution at low pH) shows a significant lower astringency score.

The results of the experiment are shown in FIG. 6. It was shown that sample 4 (whey protein) shows a constant astringency score at high concentrations, but with an increased off taste in other attributes. Sample 3 (elution at low pH) shows a significant lower astringency score. but on that attribute not comparable to WPI.

Example 11

QDA with Glycated Acidic Eluted Protein Isolate

A quantitative description analysis (QDA) testing, similar to the one described in example 6, was performed to compare the astringency of two potato protein samples, a soy protein sample and a whey protein sample. The samples were dissolved in a sports drink and then tested in a concentration of 2 wt. % based on the total weight of the sports drink.

The following protein samples were tested:
  sample 1 (PPI-NON-MOD): non-modified LMW fraction isolate obtained by acidic elution;
  sample 2 (PPI MODIFIED): LMW fraction isolate obtained by acidic elution and glycated with maltose at pH 4.0
  sample 3 (WHEY): whey protein isolate (WPI, Bipro Davisco Foods International inc, USA)
  sample 4 (SOY): highly purified soy protein isolate obtained from company ADM under the name Pro-FAM 781.

The results of the experiment are shown in FIG. 7. The QDA attribute scores showed that the glycated acidic eluted LMW protein (sample 2) has an overall better flavour score compared to samples 1, 3 and 4. The glycated acidic eluted LMW protein scored significantly better on astringency compared to the non-modified potato protein sample (sample 1).

Significancy scores from a statistical analysis on the attributes are shown in the table depicted in FIG. 8. On many of the other attributes the glycated LMW protein fraction (samples 1 and 2) perform equal or better than the WPI and soy samples.

Example 12

Effect of Glycation on Viscosity

LMW potato protein was glycated with lactose at pH 3 and 8 (LMW-PPI+lactose pH3 and pH8). Reference LMW potato protein was spray dried at pH 3 and 8 (LMW-PPI ref pH3 and pH8). The potato proteins were added to grape juice (AH brand, from local supermarket). Furthermore, lactose and WPI hyprotal (a whey protein isolate) and water was added to the samples. Table 6 shows the exact formulations of samples 1-10.

The pH of the solutions was adjusted to 3.4 (pH of the grape juice). The solutions were heated to 80° C. and kept at that temperature for 5 minutes. The solutions were cooled to 22° C. and the funnel viscosity (Marsh funnel viscometer with an internal diameter of 6 mm) was measured. The viscosity was determined by measuring the time it took for the solution to flow out of the funnel. Samples 2, 5, 6 and 8 were gelled after the heat treatment.

TABLE 6

| Recipes of protein fortified grape juices | | | | | | | | | | |
|---|---|---|---|---|---|---|---|---|---|---|
| | 1 | 2 | 3 | 4 | 5 | 6 | 7 | 8 | 9 | 10 |
| LMW-PPI + lactose pH8 | 23.4 | | | | 46.8 | | | | | |
| LMW-PPI ref pH8 | | 11.7 | | | | 23.4 | | | | |
| LMW-PPI + lactose pH3 | | | 22.4 | | | | 44.9 | | | |
| LMW-PPI ref pH3 | | | | 11.2 | | | | 22.4 | | |
| Lactose | 10.5 | 21.1 | 10.5 | 21.1 | | 21.1 | | 21.1 | 19.6 | 18.2 |
| WPI hyprotal 580 (DMV) | | | | | | | | | 12.5 | 25 |
| water | 50 | 50 | 50 | 50 | 50 | 50 | 50 | 50 | 50 | 50 |
| Grape juice (AH) | 416 | 417 | 417 | 418 | 403 | 406 | 405 | 407 | 418 | 407 |

TABLE 7

| viscosity of protein fortified grape juice | | | | | | |
|---|---|---|---|---|---|---|
| | Sample | | | | | |
| | 1 | 3 | 4 | 7 | 9 | 10 |
| Time (s) | 12 | 12 | 79 | 14 | 11 | 11 |

Sample 6 gave the stiffest gel (visual observation).
Table 7 shows the results of the viscosity measurement of the liquid samples.

It was found that all drinks comprising the reference protein (LMW-PPI ref) showed a higher viscosity compared to the drink comprising the glycated protein. Thus may be concluded that glycation reduces the gelation power of LMW-PPI. This is an advantage for application in drinks because it will allow a higher concentration in the drinks. It should be noted that the formulation that was used here contained a relatively high sugar content, which makes the drink gel already at lower protein contents compared to a drink with less sugar. It is expected that the gelation power could be decreased even further by reducing all the salts from the protein powder, e.g. by dialysis or diafiltration.

Example 13

Glycation Under the Conditions of WO 2009/117572

Patent application WO 2009/117572 (WO '572) discloses a method of preparing a polysaccharide-protein conjugate. The application states a preferred protein and polysaccharide concentration of about 10% w/v and about 30% w/v respectively (see page 9, paragraph [0038]), a preferred temperature of 50-70° C. (see page 12, paragraph [0042]), a pH of 6.0-8.0 (claim 2) and a preferred reaction time of 4-24 hours (see page 18, table 1). In view of these preferred reaction conditions, the following experiment was conducted to compare whey and potato proteins used in the method of WO 2009/117572.

Solutions of maltose in combination with either LMW or HMW potato protein (Solanic 306P or 206P, both available from Solanic, a subsidiary of Avebe) or Bipro whey protein isolate (available from Davisco Foods International) were prepared for final concentrations of 10% w/v protein and 30% w/v maltose. pHs were adjusted to 6.5 using either 6M HCl or 5M NaOH solution. The solutions prepared in this manner were heated to 60° C. for a period of 4 hours and allowed to cool at ambient temperature (about 20° C.).

Figure 9:
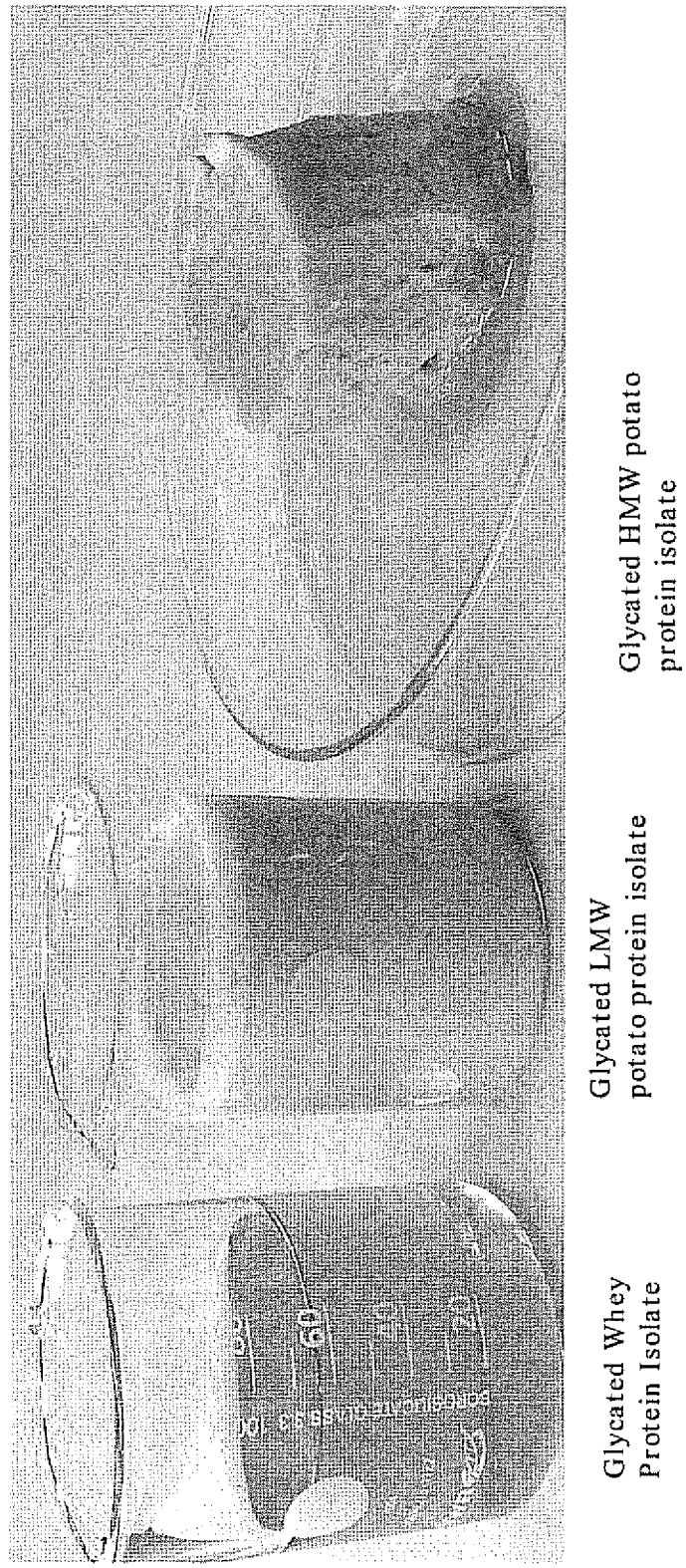
FIG. 9 is a photograph showing the results of glycation experiments: the whey protein solution remained clear, the LMW potato protein solution became highly turbid and somewhat viscous, the HMW potato protein solutions formed a solid, turbid gel.

While the whey protein solution remained clear, the LMW potato protein solution became highly turbid and somewhat viscous. The HMW potato protein solutions formed a solid, turbid gel. A photograph showing the results of these experiments is shown in FIG. 9. Mixtures with high viscosity and high turbidity are undesirable because they are hard to process. In particular, such mixtures are difficult to spray dry due to clogging of the pipes.

Example 14

Effect of Free Amine Groups on Lipase Activity

A solution of HMW potato protein at pH 6.0 was mixed with xylose (Prolabo 29013.237) at molar ratios of either 1, 10, 50 or 100 xylose molecules per HMW protein molecule and lyophilized. This resulted in powders containing between 3.6 and 27% xylose. These powders were stored under ambient conditions.

Figure 10:
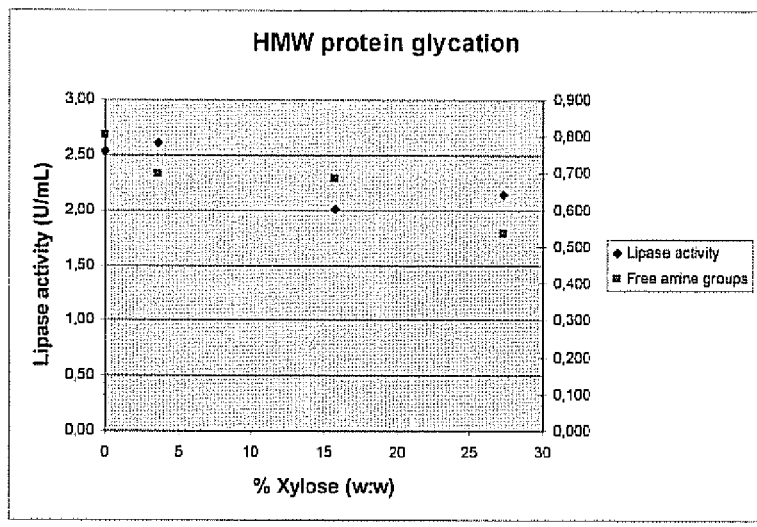
FIG. 10 is a graph showing the loss of free amines in a solution of HMW potato protein measured after 10 days.

The loss of free amines was measured after 10 days and is shown in FIG. 10.

Furthermore, the lipase activity was measured. Remarkably, glycation resulted in a loss of lipase activity (in arbitrary units) in the protein as determined according to the procedure of Hirschberg et al (Hirschberg, H. et al, Eur. J. Biochem., 2001, 286 p. 5037-5044).

Figure 11:
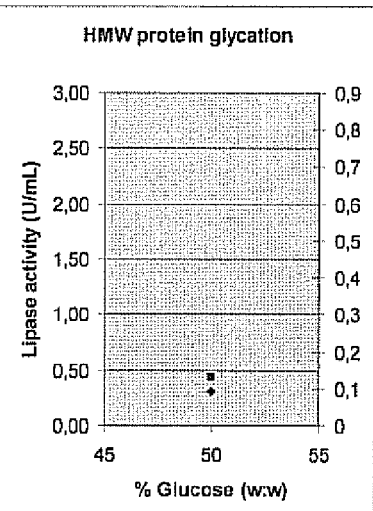
FIG. 11 is a graph showing the results of an experiment conducted using 1:1 w:w of glucose on HMW protein. The use of such high amounts of sugar for glycation resulted in a near complete removal of lipase activity.

A similar experiment as described above was conducted using 1:1 w:w of glucose on HMW protein. The use of such high amounts of sugar for glycation resulted in a near complete removal of lipase activity, as shown in FIG. 11.

Thus, it can be concluded that glycation of a potato protein according to the invention results in a reduction in enzyme activity such as lipase activity.

Example 15

Effect of Glycation on Gel Strength

Glycated HMW samples were made by spray drying a high molecular weight potato protein and a reducing saccharide followed by a heating step for 48 hours in a climate chamber at 60° C. and 60% RH. In all cases sugar and powder were first dissolved in water in a sugar:protein ratio of 1:1 at pH 5 and then spray-dried. For xylose the ratio of sugar to protein was 0.075:1. Table 8 shows the different powders that were prepared (samples 1-9) and the parameters that were measured on these samples.

TABLE 8

Sample overview

| Sample no. | sugar | pH | Heat treatment | % dry matter |
|---|---|---|---|---|
| 1 (reference) | — | | no | 93.8 |
| 2 | xylose | 5 | no | 92.0 |
| 3 (reference) | — | 5 | yes | 91.3 |
| 4 | glucose | 5 | yes | 89.0 |
| 5 | maltose | 5 | yes | 88.2 |
| 6 | lactose | 5 | yes | 92.3 |
| 7 | glucose | 5 | no | 86.7 |
| 8 | maltose | 5 | no | 91.5 |
| 9 | lactose | 5 | no | 92.2 |

The gel strength of samples 1-9 was tested in a gel with 8% of the HMW protein sample, 1% salt and pH 6. The concentrations were based on dry matter content (see table 8). When sugar was present the amount of powder was increased to obtain equal protein contents in all solutions. The protein solution was heated in 200 ml glass beakers for 45 minutes in a water bath at 90° C. The gel strength was measured with a P0.5 (½" DIA CYLINDER EBONITE) on a texture analyzer (SMS). The test speed was 1.5 mm/s and the penetration depth was 8 mm. The maximum force was determined from the time-force curve.

Figure 12:
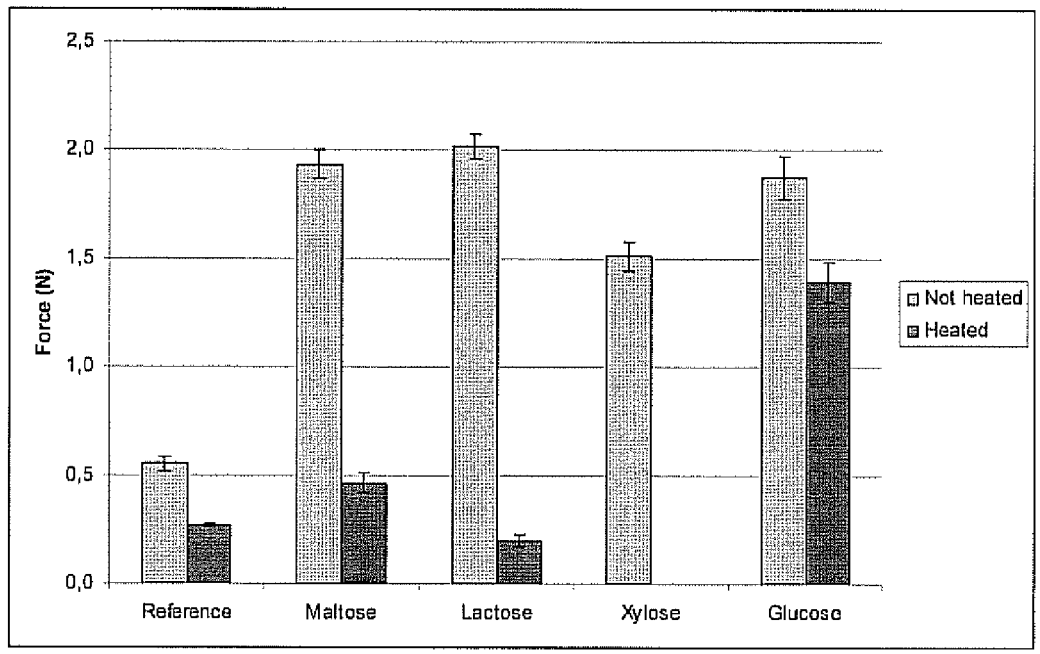
FIG. 12 is a graph showing the results of an experiment testing the effect of glycation on gel strength. Mixtures thus obtained that had a gel strength below 0.5 N were considered not to be a gel. This was the case for HMW heated without sugars (sample 3) and for the gels with HMW which was heated (glycated) with maltose and lactose (samples 5 and 6). It can be concluded that the heat treatment step at 60% RH and 60° C. made the gelation behaviour worse.

The results are shown in FIG. 12. Mixtures thus obtained that had a gel strength below 0.5 N were considered not to be a gel. This was the case for HMW heated without sugars (sample 3) and for the gels with HMW which was heated (glycated) with maltose and lactose (samples 5 and 6). It can be concluded that the heat treatment step at 60% RH and 60° C. made the gelation behaviour worse.

The gels with HMW and the sugars contained more dry matter and therefore gave a higher gel strength compared to the reference sample 1. In general glycation is negative for gel formation at pH 6 with 1% salt. Only for glucose the effect is smaller compared to lactose and maltose. Xylose gave the best result after reaction, because this sugar reacts at room temperature and therefore the undesirable heat treatment was not necessary.

Thus, the advantage of using xylose in this case is that it can be used to glycate the potato protein at room temperature without conducting a heat treatment. Consequently, glycation with xylose does not (or at least only to a small extent) have a negative effect on the gelation power. By using xylose the glycation reaction can be conducted at room temperature, resulting in less loss of functional properties.

The invention claimed is:

1. Potato protein glycated with a reducing saccharide, obtained by the method comprising reacting a potato protein with a reducing saccharide under dry or semi-dry conditions, at a pH of 2-8 and at a temperature of 10-80° C., wherein the reducing saccharide is chosen from the group consisting of reducing monosaccharides, reducing disaccharides, dextran and combinations thereof.

2. Protein according to claim 1, wherein at least 40% of the amino groups in the lysine, asparagine, glutamine, arginine and histidine residues in the potato protein are glycated with a reducing sugar.

3. Protein according to claim 1, wherein the reducing sugar is a reducing disaccharide.

4. Protein according to claim 1, wherein the reducing sugar is chosen from the group consisting of maltose, dextran, lactose and combinations thereof.

5. Protein according to claim 1, wherein the potato protein has molecular weight below 40 kDa.

6. Protein according to claim 1, wherein the potato protein is a protease inhibitor.

7. Food additive comprising a protein according claim 1.

8. Food additive according to claim 7, wherein the food additive is a powder comprising 40-100 wt. % of a potato protein glycated with a reducing saccharide, wherein the reducing saccharide is chosen from the group consisting of reducing monosaccharides, reducing disaccharides, dextran and combinations thereof, 0-15 wt. % water and 0-25 wt. % of a reducing sugar, based on the total weight of the food additive.

9. Food additive according to claim 7, wherein the food additive is a powder comprising 40-100 wt. % of a protein wherein at least 40% of the amino groups in the lysine, asparagine, glutamine, arginine and histidine residues in the potato protein are glycated with a reducing sugar, 0-15 wt. % water and 0-25 wt. % of a reducing sugar, based on the total weight of the food additive.

10. Food additive according to claim 7, wherein the food additive is a powder comprising 40-100 wt. % of a protein wherein the reducing sugar is a reducing disaccharide, 0-15 wt. % water and 0-25 wt. % of a reducing sugar, based on the total weight of the food additive.

11. Food additive according to claim 7, wherein the food additive is a powder comprising 40-100 wt. % of a protein wherein the reducing sugar is chosen from the group consisting of maltose, dextran, lactose and combinations thereof, 0-15 wt. % water and 0-25 wt. % of a reducing sugar, based on the total weight of the food additive.

12. Food additive according to claim 7, wherein the food additive is a powder comprising 40-100 wt. % of a protein wherein the potato protein has molecular weight below 40 kDa, 0-15 wt. % water and 0-25 wt. % of a reducing sugar, based on the total weight of the food additive.

13. Food additive according to claim 7, wherein the food additive is a powder comprising 40-100 wt. % of a protein wherein the potato protein is a protease inhibitor, 0-15 wt. % water and 0-25 wt. % of a reducing sugar, based on the total weight of the food additive.

14. Food product comprising a protein according to claim 1 in an amount of 0.4-10 wt. %, based on the total weight of the food product.

15. Food product according to claim 14 comprising an aqueous solution in which the protein is dissolved.

16. Food product according to claim 15, wherein the food product is a beverage.

17. Food product according to claim 15, wherein the aqueous solution has a pH lower than 7.

18. Method for glycating a potato protein comprising reacting a potato protein with a reducing saccharide under dry or semi-dry conditions, at a temperature of 10-80° C. and a pH of 2-8.

19. Method according to claim 18, wherein the protein and saccharide are obtained by drying an aqueous solution having a pH of 2-8 comprising the potato protein and the reducing saccharide.

20. Method according to claim 19, wherein the solution is dried to a semi-dry powder comprising 2-15 wt. % water, based on the total weight of reducing saccharide and potato protein.

21. Method according to claim 18, wherein the amount of reducing saccharide is 0.7-50 wt. %, based on the total weight of the potato protein.

22. Method according to claim 18, wherein the reaction is conducted at a relative humidity of 20-80%.

23. Method according to claim 18, wherein the potato protein originates from a potato protein isolate, which isolate has been obtained by a method comprising the steps of
optionally subjecting potato fruit juice to a flocculation by a divalent metal cation;
centrifuging the flocculated potato fruit juice, thereby forming a supernatant;
subjecting the supernatant to adsorption chromatography operated at a pH of less than 11 and a temperature of 5 to 35° C. using an adsorbent capable of binding potato protein, thereby adsorbing the potato protein to the adsorbent; eluting the potato protein from the adsorbent at a pH of 1.5-3.5, thereby forming the potato isolate.

24. A method according to claim 23, wherein the adsorption chromatography is a mixed mode adsorption chromatography.

25. A method according to claim 23, wherein, the chromatography step can be carried out using a fixed bed, an expanded bed or a membrane adsorber.

26. A method according to claim 23, wherein the eluent comprises formic acid (HCOOH), hydrochloric acid (HCl) or phosphoric acid ($H_3PO_4$).

27. Method according to claim 23, further comprising subjecting potato fruit juice to a flocculation by a divalent metal cation.

* * * * *